United States Patent
Seto et al.

[19]

[11] Patent Number: 5,809,829
[45] Date of Patent: Sep. 22, 1998

[54] BALL SCREW AND WORK FEEDING DEVICE USING SAME

[75] Inventors: Yoshiharu Seto; Shunzo Hirose, both of La Mirada, Calif.

[73] Assignee: Amada Mfg America Inc., La Mirada, Calif.

[21] Appl. No.: 755,601

[22] Filed: Nov. 25, 1996

[51] Int. Cl.$^6$ ............................. F16H 25/20; F16F 15/10
[52] U.S. Cl. .................... 74/89.15; 74/574; 74/424.8 R; 464/180
[58] Field of Search ................... 74/89.15, 574, 74/424.8 R; 470/9; 464/180, 183

[56] References Cited

U.S. PATENT DOCUMENTS

| | | | |
|---|---|---|---|
| 3,207,009 | 9/1965 | Carlstedt | 74/574 X |
| 3,555,927 | 1/1971 | Plume | 74/574 |
| 4,030,137 | 6/1977 | Daiziel | 74/574 |
| 4,272,971 | 6/1981 | Loyd et al. | 464/183 X |
| 4,318,280 | 3/1982 | Williams | 464/183 X |
| 4,671,127 | 6/1987 | Yamaguchi et al. | 74/89.15 |
| 4,834,693 | 5/1989 | Profant et al. | 464/183 |
| 5,232,073 | 8/1993 | Bronowicki et al. | 188/378 |
| 5,379,660 | 1/1995 | Ishikawa | 464/180 X |
| 5,613,400 | 3/1997 | Sato et al. | 74/89.15 |
| 5,672,365 | 9/1997 | Ishii et al. | 425/127 |

FOREIGN PATENT DOCUMENTS

| | | | |
|---|---|---|---|
| 60-60366 | 4/1985 | Japan | 74/89.15 |
| 63-9765 | 1/1988 | Japan | 74/89.15 |
| 1-145465 | 6/1989 | Japan | 74/89.15 |
| 2-113152 | 4/1990 | Japan | 74/89.15 |

*Primary Examiner*—Rodney H. Bonck
*Assistant Examiner*—William C. Joyce
*Attorney, Agent, or Firm*—Wigman, Cohen, Leitner & Myers, P.C.

[57] ABSTRACT

In a work feeding device for a plate work processing machine (e.g., a turret punch press), when a ball screw (1) is rotated by a drive motor, a ball nut (103) in mesh with the ball screw and fixed to a worktable is moved in the work feeding direction. Here, the ball screw is divided into a central portion (3) and an outer portion (5). The outer portion (5) thereof is formed of an ordinary material (e.g., steel), and the central portion (3) thereof is formed of a hard material (e.g., cemented carbide) of high longitudinal elastic coefficient. Since the maximum number of revolutions of the ball screw (i.e., the resonance frequency of the ball screw) can be increased, it is possible to move and locate plate work at a high speed, thus realizing a high speed punching processing to improve the working efficiency.

8 Claims, 5 Drawing Sheets

($\lambda = 1.875$)

($\lambda = 3.927$)

($\lambda = 4.730$)

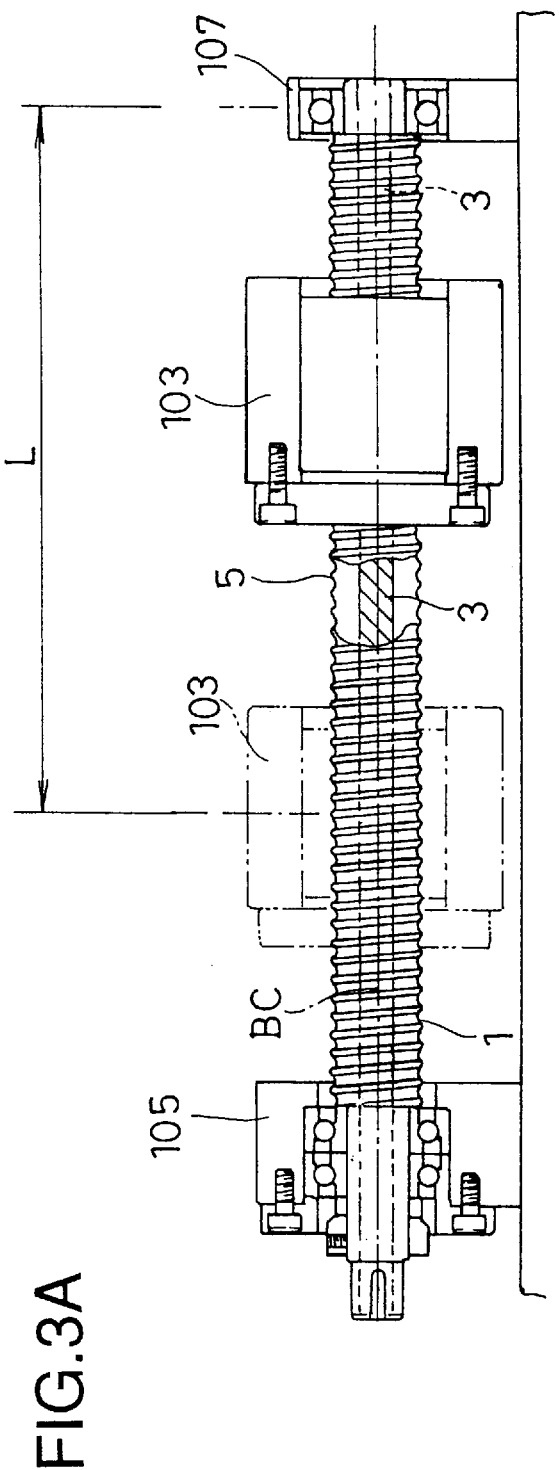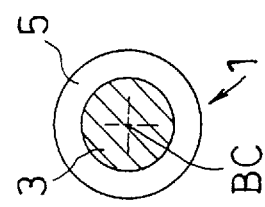
FIG.3A
FIG.3B

BALL SCREW AND WORK FEEDING DEVICE USING SAME

BACKGROUND OF THE INVENTION

1. Field of the Invention

The present invention relates to a ball screw and a work feeding device for a plate work processing machine which uses the same ball screw.

2. Description of the Related art

Conventionally, a ball screw is used for a work feeding device for a plate work processing machine such as a turret punch press, for instance. In the conventional ball screw, however, when the rotating velocity of the ball screw increases up to a resonance frequency thereof, since the ball screw shaft is vibrated violently, it is impossible to continue to rotate the ball screw. The same problem as above arises when the ball nut is rotated at its resonance frequency.

The maximum rotating velocity (the resonance frequency) (r.p.m) of the ball screw can be expressed as follows:

$$NC = 60\,\lambda^2/(2\pi \cdot L^2) \times \{E \cdot I \cdot g/(A \cdot \rho)\}^{1/2} \qquad (1)$$

where

L: distance between two supporting points of screw shaft (cm)

ρ: specific weight of screw shaft (kg/cm$^3$)

g: gravitational acceleration (980 cm/sec$^2$)

I: geometrical moment of inertia (second moment of area) (cm$^4$) of minor diameter of screw shaft λ: support coefficient of screw shaft E: longitudinal elastic coefficient (modulus) of screw shaft (kg/cm$^2$)

A: cross sectional area of minor diameter of screw shaft (cm$^2$)

In practice, however, a value less than 80% of the above maximum rotating velocity (rpm) is used for safety. That is, the maximum allowable rotating velocity of the ball screw shaft (NCO) can be represented as $$NCO = NC \times 0.8 \text{(rpm)}$$

On the other hand, the support coefficient of the screw shaft (λ) differs according to the supporting method, as shown in FIGS. 1A to 1C, in which a ball screw is denoted by 101 and a ball nut is denoted by 103. That is, when one end of the screw shaft 101 is fixed by a fixed bearing 105 and the other end thereof is supported free, as shown in FIG. 1A, the distance L between the two supporting points for calculating the maximum allowable rotating velocity NCO becomes a distance between the moved ball nut 103 and the free end of the ball screw 101, and the support coefficient λ is determined as 1.875.

When one end of the screw shaft 101 is fixed by the fixed bearing 105 and the other end thereof is supported by a support bearing 107, as shown in FIG. 1B, the distance (L) between the two supporting points for calculating the same becomes a distance between the moved ball nut 103 and the support bearing 107, and the support coefficient λ is determined as 3.927.

Further, when the ends of the screw shaft 101 are both fixed by two fixed bearings 105 and 109, as shown in FIG. 1C, the distance (L) between the two supporting points for calculating the same becomes a distance between the moved ball nut 103 and the fixed bearing 109, and the support coefficient λ is determined as 4.730.

As clearly understood form the formula (1), since the maximum allowable number NCO of revolutions of the ball screw shaft is inversely proportional to the square of the distance L$^2$, when the distance L is long in general; that is, in the case of the processing machine of large worktable stroke, there arises a problem in that it is impossible to rotate the ball screw shaft at a high speed, because the maximum allowable rotating velocity NCO (rpm) of the feeding screw is small.

Conventionally, therefore, this problem has been so far solved by improving the structure or the material of the ball screw as follows:

FIGS. 2A and 2B show an example in which the structure is improved to reduce the distance L of the formula (1) by use of two intermediate supports 111R and 111L, that is, to increase the maximum allowable rotating velocity of the ball screw 113.

In more detail, in FIG. 2A, a ball screw 113 is rotatably supported by two bearings 117L and 117R provided on both right and left side ends of a base 115. The left side end of the ball screw 113 is connected to a main motor 121 mounted on a motor bracket 119 on the left side end of the base 115. Further, two linear guide rails 123U and 123D are arranged on the base 115 in parallel to and on both sides of the ball screw 113 in FIG. 2A.

Further, a ball nut 103 in mesh with the ball screw 113 is provided between the two supporting portions of the ball screw 113 and on the lower surface of a worktable 125, to move and locate work. Further, four worktable guide nuts 127 movable along the two linear guide rails 123U and 123D, respectively are mounted on the lower surface of and at the four corners of the worktable 125.

Therefore, when the main motor 121 is driven and thereby the ball screw 113 is rotated, since the ball nut 103 is moved right and left along the ball screw 113, the worktable 125 can be moved right and left along the two linear guide rails 123U and 123D.

On the other hand, two right and left rigid intermediate supports 111L and 111R for movably linking the ball screw 113 with the two linear guide rails 123U and 123D are provided between the two ball screw supporting portions (the bearings 117L and 117R) and near both the right and left side portions of the base 115. The two intermediate supports 111L and 111R are supported by the two linear guide rails 123U and 123D via two sliders 131, respectively so as to be movable in the right and left direction in FIG. 2A. Further, the ball screw 113 is rotatably supported by the two intermediate supports 111L and 111R via two ball bearing nuts 129 at the middle portion of the intermediate support, respectively. In addition, the two intermediate supports 111L and 111R are linked with each other by a link rod 133 to keep a constant distance between the two intermediate supports 111L and 111R.

Further, an intermediate support ball screw 135 is provided between the upper side linear guide rail 123U and the ball screw 113. The left side end of this intermediate support ball screw 135 is rotatably supported by a bearing 137 and further connected to an intermediate support motor 139. Further, an intermediate support ball nut 141 in mesh with the intermediate ball screw 135 is attached to the left side intermediate support 111L.

Therefore, when the intermediate support motor 139 is driven and thereby the intermediate support ball screw 135 is rotated, since the intermediate support ball nut 141 is moved in the right and left direction, the two intermediate supports 111L and 111R are moved right and left.

Here, the ratio of the movement velocity of the worktable 125 driven by the main motor 121 via the ball screw 113 to the movement velocity of the two intermediate supports 111L and 111R driven by the intermediate support motor 139 via the intermediate support ball screw 135 is determined as 2:1 in synchronism with each other. As a result, the ball bearing nut 129 is always moved by a half distance of the whole stroke of the worktable 125.

As described above, in the above-mentioned structure, since the distance L between the two screw shaft support points can be reduced, it is possible to increase the maximum allowable rotating velocity of the ball screw.

In the above-mentioned structure, however, since the two intermediate supports 111L and 111R are provided, there exists a problem in that the overall length of the work feeding device is lengthened and additionally in that the structure is complicated.

Further, on the other hand, it is possible to increase the maximum allowable rotating velocity of the ball screw by forming the ball screw of a material having a high longitudinal elastic coefficient. In this case, however, there arises another problem in that the material of high longitudinal elastic coefficient is generally hard and therefore brittle, so that the ball screw is not sufficiently resistant against vibrations or a shock.

SUMMARY OF THE INVENTION

Accordingly, it is the object of the present invention to provide a ball screw for a work feeding device for a plate work processing machine, which can increase the allowable rotating velocity of the ball screw, to move and locate plate work at a high speed for improvement of working efficiency.

To achieve the above-mentioned object, the present invention provides a ball screw rotated by a drive motor to move a ball nut in mesh therewith and fixed to a worktable, wherein the ball screw is divided into a central portion and an outer portion each formed of two materials of different longitudinal elastic coefficients.

Here, it is preferable that the outer portion of the ball screw is formed of a steel, and the central portion thereof is formed of a material having a longitudinal elastic coefficient higher than that of the material of the outer portion. The central portion is formed of cemented carbide, for instance.

Further, it is preferable that the central portion extends to all over length of the ball screw or to a part of length of the ball screw from an end the ball screw.

Further, the present invention provides a work feeding device for a machine such as a turret punch press, which includes the ball screw according to the present invention.

In the ball screw for a work feeding device according to the present invention, since the ball screw is divided into a central portion and an outer portion in such a way that the outer portion thereof is formed of an ordinary material (e.g., steel) and the central portion thereof is formed of a hard material (e.g., cemented carbide) of high longitudinal elastic coefficient, the maximum rotating velocity of the ball screw (i.e., the resonance frequency of the ball screw) can be increased, so that it is possible to move and locate plate work at a high speed, thus realizing a high speed punching processing, for instance for improvement of working efficiency.

BRIEF DESCRIPTION OF THE DRAWINGS

FIG. 3A is a side, partially broken view showing a ball screw according to the present invention;

FIG. 3B is a cross-sectional view showing the same ball screw shown in FIG. 3A;

DETAILED DESCRIPTION OF THE PREFERRED EMBODIMENTS

Figure 1A:
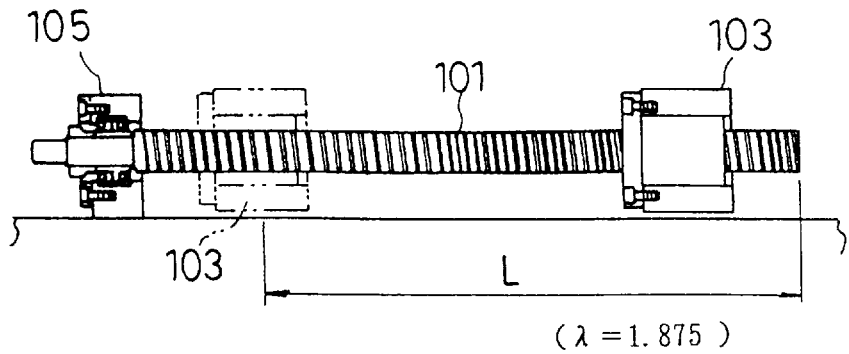
FIGS. 1A to FIG. 1C are side views for assistance in explaining various supporting modes of the ball screw.
Figure 1B:
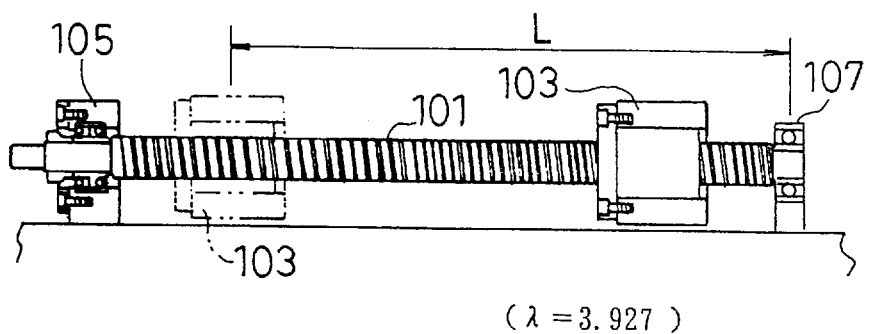
Figure 1C:
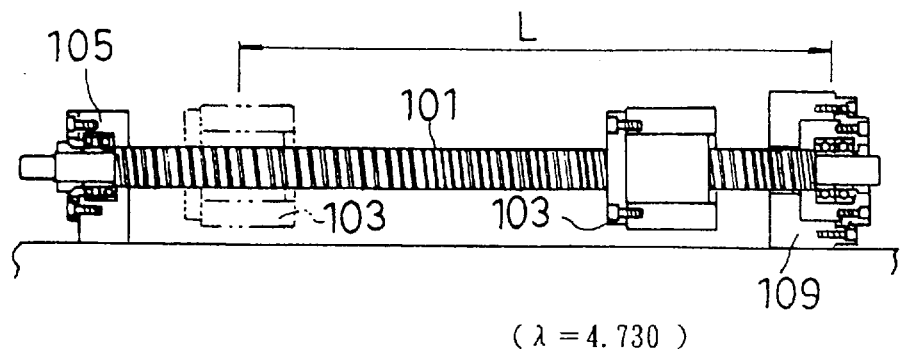
Figure 2A:
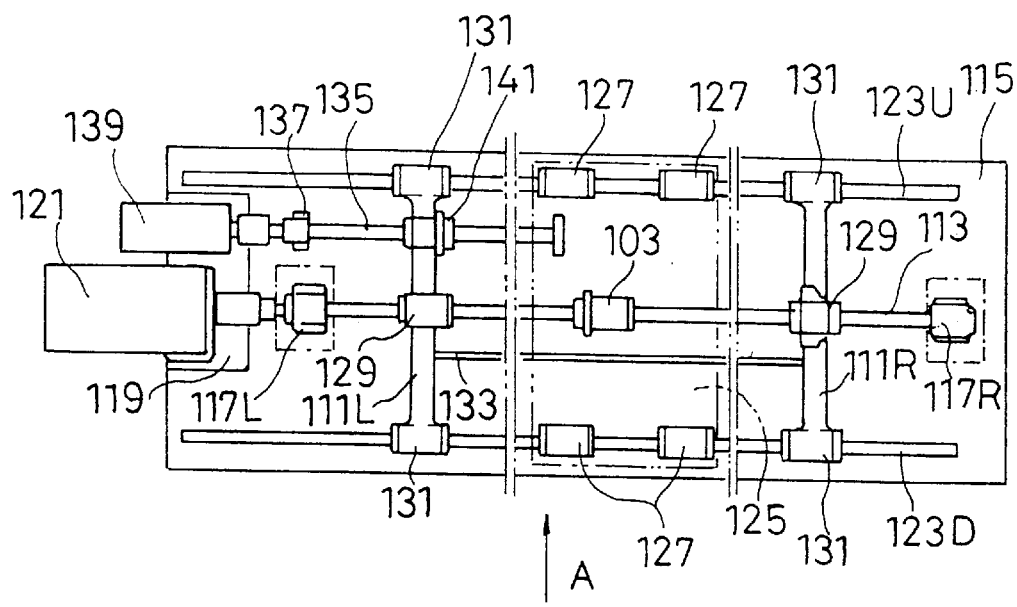
FIG. 2A is a plane view showing an example of conventional work feeding device structure, in which the ball screw is supported by two intermediate supports to increase the maximum allowable rotating velocity of the ball screw.
Figure 2B:
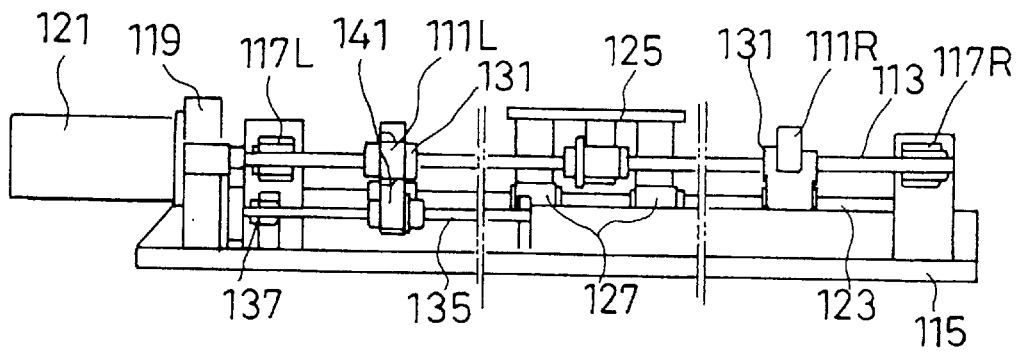
FIG. 2B is a side view when seen from the arrow direction A in FIG. 2A.

An embodiment of the ball screw according to the present invention will be explained hereinbelow with reference to the attached drawings.

In FIG. 3A, a ball screw 1 is supported in such a way that one (the left side) end thereof is fixed by a fixed bearing 105 and the other (the right side) end thereof is supported by a support bearing 107. Further, a ball nut 103 is in mesh with the ball screw 1. Further, in FIG. 3B, BC denotes a center axis of the ball screw; 3 denotes a central portion of the ball screw; and 5 denotes an outer portion of the ball screw.

The feature of the ball screw 1 according to the present invention is that the cross section of the ball screw is of double structure; that is, the central portion 3 thereof is formed of a hard material of large E/ρ (E: longitudinal elastic coefficient (kg/cm$^2$); and ρ: specific weight (kg/cm$^2$) (e.g., cemented carbide) and the outer portion 5 thereof is formed of a general ball screw material (e.g., chromium molybdenum steel).

Here, the longitudinal elastic coefficient of the outer portion 5 (e.g., chromium molybdenum steel) is denoted by E1, and the specific weight of the outer portion 5 is denoted by ρ1. Further, the longitudinal elastic coefficient of the central portion 3 (e.g., cemented carbide) is denoted by E3, and the specific weight of the central portion 3 is denoted by ρ3. Further, the longitudinal elastic coefficient of the double-structure ball screw 1 is denoted by E2, and the specific weight thereof is denoted by ρ2.

Then, in the double-structure ball screw 1 of the present invention, since both the materials are combined with each other, the following relationship can be obtained:

$(E1/\rho1)$ (outer) $< (E2/\rho2)$ (combined) $< (E3/\rho3)$ (central)

Therefore, it is apparent that the following relationship can be obtained among the respective maximum numbers NC1, NC2 and NC3 of revolutions of the ball screws formed of the respective materials in accordance with the formula (1):

$NC1$ (outer) $< NC2$ (combined) $< NC3$ (central)

The practical numerical examples of the ball screw 1 as described in FIGS. 3A and 3(B) are as follows:

The longitudinal elastic coefficient of chromium molybdenum steel of the outer portion 5 is $E1=2.1 \times 10^6$ (kg/cm$^2$), and the specific weight thereof is $\rho1=7.8 \times 10^{-3}$ (kg/cm$^2$). Further, the longitudinal elastic coefficient of cemented carbide of the central portion 3 is $E3=6.2 \times 10^6$ (kg/cm$^2$), and the specific weight thereof is $\rho3=14.7 \times 10^{-3}$ (kg/cm$^2$).

Therefore, the maximum number $NC1$ of the revolutions of the outer portion 5 can be obtained in accordance with the formula (1) as follows:

$$NC1 = 60 \; \lambda^2/2\pi L^2 \times \{2.1 \times 10^6 \times 980 \times I/(A \times 0.0078)\}^{1/2} = 5.14 \times 10^5 \times \alpha$$

where $\alpha = 60 \; \lambda^2/2\pi L^2 \times (I/A)^{1/2}$

In the same way, the maximum number $NC3$ of the revolutions of the central portion 3 can be obtained as:

$$NC3 = 6.43 \times 10^5 \times \alpha$$

As described above, in the ball screw of the present invention, since the ball screw is partially formed of a material of large $E/\rho$, it is possible to increase the maximum rotating velocity of the ball screw. Further, since the hard material is used at the central portion of the ball screw, it is possible to minimize the inner stress and the inner strain of the hard material. As a result, when the ball screw according to the present invention used, it is possible to realize a high speed work feeding device, without use of any complicated structure and without causing the problem with respect to resistance against vibrations and shock.

Figure 4A:
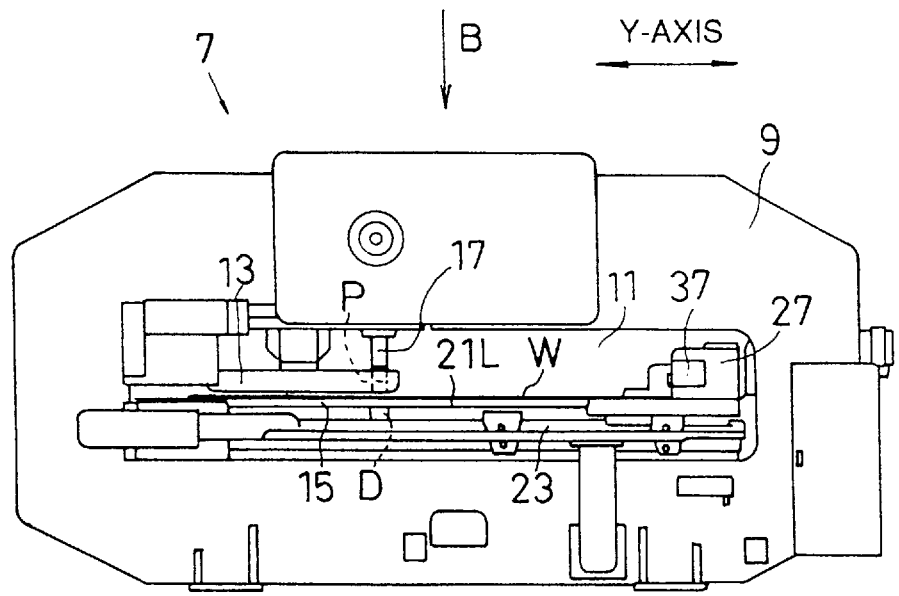
FIG. 4A is a front view showing a turret punch press to which the ball screw and the work feeding device according to the present invention is applied.
Figure 4B:
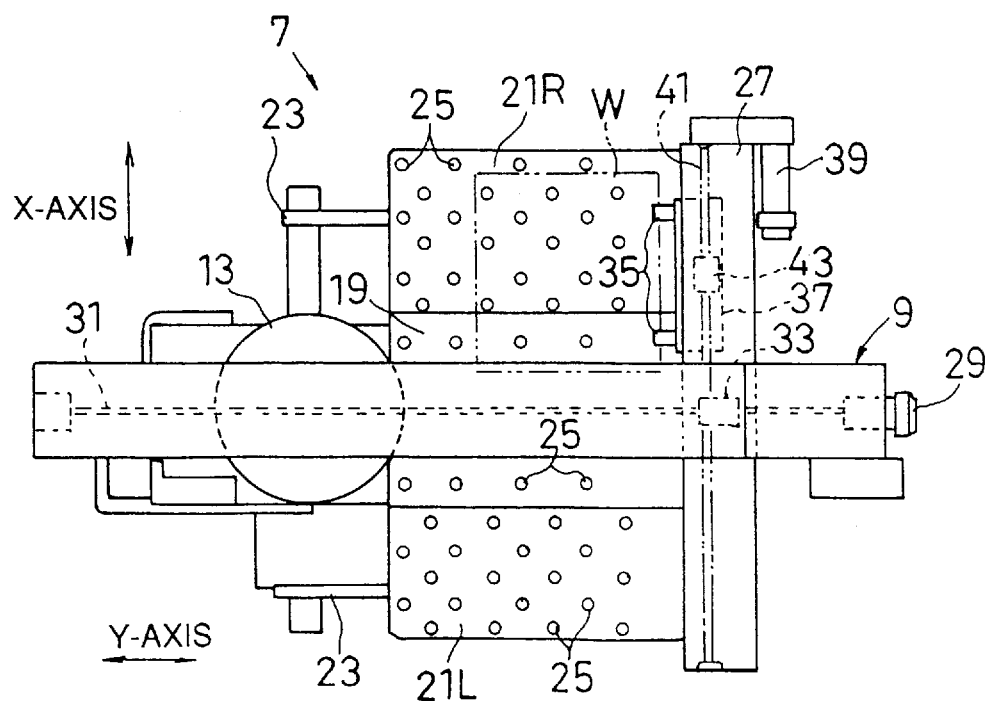
FIG. 4B is a plane view showing the same turret punch press when seen from the direction B in FIG. 4A.

With reference to FIGS. 4A and 4B, a turret punch press 7 will be explained as an example of the plate work processing machine using the ball screw 1 according to the present invention.

In the drawings, a turret punch press 7 is provided with a vertical frame 9 formed with a central gap portion 11 at the middle thereof. Within this gap portion 11, an upper turret 13 on which a plurality of upper punching tools P (punches) and a lower turret 15 on which a plurality of lower punching tools D (dies) are rotatably and indexably arranged. Further, a striker 17 for striking the upper tool P is provided over the upper turret 13.

Accordingly, after any desired pair of the punch and the die have been selected and further after the work W has been located between the upper and lower punching tools P and D, the work W can be punched out in cooperation with the lower tool D, by striking the upper tool P with the striker 17.

At the middle of the gap portion 11, a fixed table 19 is provided. Further, two movable tables 21L and 21R are provided on both sides of the fixed table 19. A pair of guide rails 23 are fixed under the lower surfaces of the two movable tables 21L and 21R, respectively so as to extend in Y-axis direction (in the right and left direction in FIGS. 4A and 4B). Further, two sliders (not shown) moved along these guide rails 23 are fixed to the lower surfaces of the two movable tables 21L and 21R, respectively. In addition, a number of ball bearings are arranged on the upper surfaces of the fixed table 19 and the movable tables 21L and 21R for rotatably supporting the work W.

On the right side in FIG. 4B and on the upper surfaces of the movable tables 21L and 21R, a carriage base 27 fixed to the two movable tables 21L and 21R is provided so as to cross over the fixed table 19. Therefore, the carriage base 27 can be moved in the horizontal (Y-axis) direction together with the movable tables 21L and 21R.

Further, a Y-axis drive motor 29 is provided on the right side of the frame 9 to move the movable tables 21L and 21R and the carriage base 27 together in the horizontal (Y-axis) direction. A ball screw 31 the same as the ball screw 1 shown in FIGS. 3A and 3B is rotatably provided at the central portion of the frame 9 in such a way as to be driven by the Y-axis drive motor 29 via a gear mechanism (not shown), for instance.

On the other hand, a Y-axis ball nut 33 in mesh with the Y-axis ball screw 31 is attached to the middle lower surface of the carriage base 27. Therefore, when the Y-axis ball screw 31 is rotated by the Y-axis drive motor 29, the carriage base 27 can be moved and located via the Y-axis ball nut 33 in position in the Y-axis direction.

On the carriage base 27, a carriage 37 having two work dampers 35 for clamping the work W is provided movably in an X-axis (in the vertical direction in FIG. 4B). On one end of the carriage base 27, a carriage motor 39 is mounted, and further an X-axis ball screw 41 the same as the ball screw 1 shown in FIGS. 3A and 3B is connected to the carriage motor 39 via a gear mechanism (not shown). Further, an X-axis ball nut 43 in mesh with the X-axis ball screw 41 is fixed to the carriage 37. The X-axis movement mechanism composed of the carriage motor 39 mounted on the carriage base 27, the X-axis ball screw 41, and the X-axis ball nut 43 is constructed in the same way as with the case of the afore-mentioned Y-axis movement mechanism.

Therefore, when the Y-axis motor 29 is driven, since the Y-axis ball screw 31 is rotated, the carriage base 27 can be moved and located in the Y-axis direction. Further, when the X-axis motor 39 is driven, since the X-axis ball screw 41 is rotated, the carriage base 27 for clamping the work W can be moved and located in the X-axis direction. After the work W has been located just between the selected pair of the upper tool P of the upper turret 13 and the lower tool D of the lower turret 15, the upper tool P is struck by the striker 17 to process the work W.

In the turret punch press 7 using the two X- and Y-axis work feeding devices each including the ball screw according to the present invention, since the work can be moved and located in position both in the X-axis and Y-axis directions at high speed, it is possible to improve the working efficiency. Further, when the ball screw according to the present invention is applied to the relatively long X- and Y-axis ball screws 41 and 31 and rotated at a high rotational velocity, it is possible to effectively prevent the ball screw from being vibrated.

Figure 5:
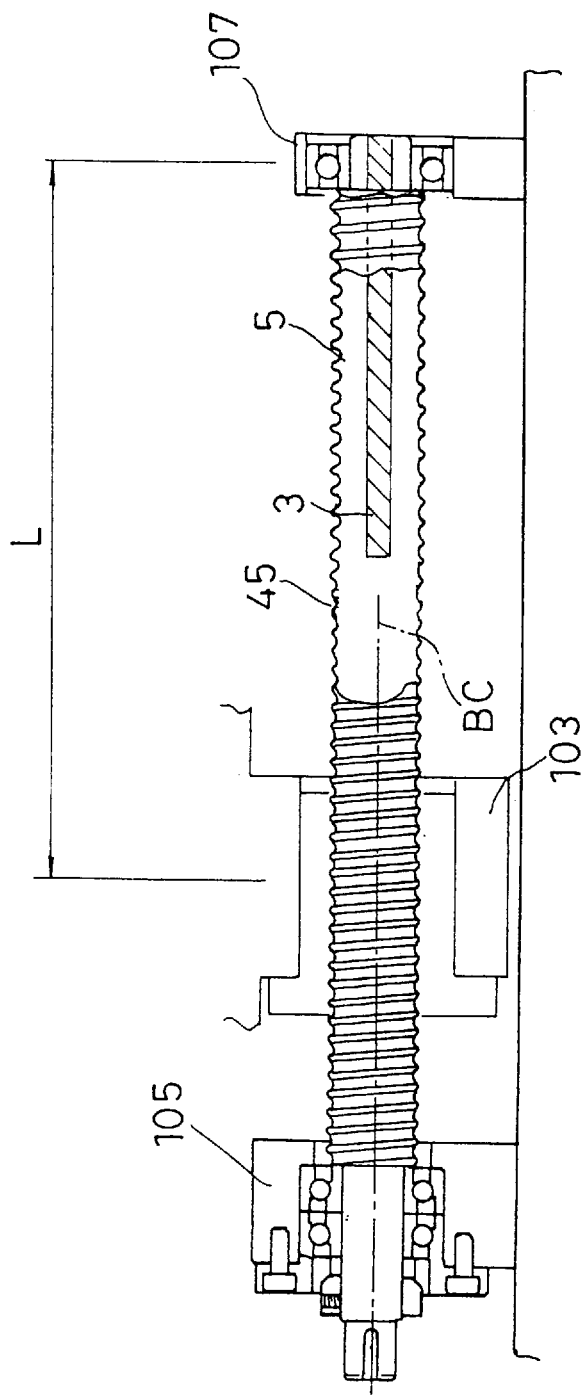
FIG. 5 is a cross-sectional view showing a modification of the ball screw according to the present invention.

Further, without being limited to only the above-mentioned embodiment, the ball screw according to the present invention can be modified in various ways. For instance, without being limited to only the ball screw as shown in FIG. 3A in which the ball screw is of double structure all over the length thereof, it is possible to obtain the similar effect when a part of the ball screw is formed into double structure, as shown in FIG. 5. In FIG. 5, the central portion 3 formed of a hard material extends a distance from the free end of the ball screw, so that it is possible to increase the maximum allowable rotating velocity of the ball screw effectively.

Further, in the turret punch press 7 shown in FIGS. 4A and 4B, although the two ball screws according to the present invention are applied to both the X- and Y-axis work feeding devices, respectively, it is of course possible to apply the ball screw according to one of both directions. In this case, it is effective to apply the ball screw according to the present invention to a work feeding device of longer stroke.

Further, in the above-mentioned embodiment, although the ball nut is moved by rotating the ball screw, it is possible to apply the ball screw according to the present invention to the case where the ball nut is fixed and the ball screw is moved in the axial direction thereof, respectively.

As described above, in the ball screw for a work feeding device according to the present invention, since the ball screw is divided into a central portion and an outer portion in such a way that the outer portion thereof is formed of an ordinary material (e.g., steel) and the central portion thereof is formed of a hard material (e.g., cemented carbide) of high longitudinal elastic coefficient, the maximum rotating velocity of the ball screw (i.e., the resonance frequency of the ball screw) can be increased, so that it is possible to move and locate plate work at a high speed, thus realizing a high speed punching processing, for instance for improvement of working efficiency.

What is claimed is:

1. A ball screw for a workpiece feeding device, said ball screw being in the form of a solid shaft and comprising:
    a central portion shaped to be a column and formed so as to include a center axis of said ball screw and extend along said center axis; and
    an outer portion fittingly disposed outside said central portion;
    wherein said center portion of said ball screw is formed from a material having a greater longitudinal elastic coefficient than a longitudinal elastic coefficient of said outer portion.

2. A ball screw of claim 1, wherein said outer portion is formed from steel.

3. A ball screw of claim 2, wherein said center portion is formed from cemented carbide.

4. A ball screw of claim 1, wherein said center portion is formed so as to extend to a full length of said ball screw.

5. A ball screw of claim 1, wherein said center portion is formed so as to extend to a partial length of said ball screw.

6. A workpiece feeding device, comprising:
    a ball screw being in a form of a solid shaft, said ball screw including a central portion shaped to be a column and formed so as to include a center axis of said ball screw and extend along said center axis, and an outer portion fittingly disposed outside said central portion;
    a ball nut disposed in mesh with said ball screw;
    a fixed bearing for fixing one end of said ball screw; and
    a support bearing for rotatably supporting said ball screw;
    wherein said center portion of said ball screw is formed from a material having a greater longitudinal elastic coefficient than a longitudinal elastic coefficient of said outer portion.

7. A ball screw of claim 6, wherein said center portion is formed so as to extend to a full length of said ball screw.

8. A ball screw of claim 6, wherein said center portion is formed so as to extend to a partial length of said ball screw.

* * * * *